United States Patent [19]
Leclou

[11] 3,719,558
[45] March 6, 1973

[54] LIQUID-COOLED NUCLEAR REACTOR

[75] Inventor: Andre Leclou, Fosses, France

[73] Assignee: Commissariat A L'Energie Atomique, Paris, France

[22] Filed: March 22, 1968

[21] Appl. No.: 715,384

[30] Foreign Application Priority Data

March 28, 1967 France..............................67100504

[52] U.S. Cl......................................176/65, 176/50
[51] Int. Cl. ...............................................G21c 19/28
[58] Field of Search...................................176/50, 65

[56] References Cited

UNITED STATES PATENTS 3,245,879  4/1966  Purdy et al. .........................176/65 X
3,290,222  12/1966  Schoessow et al...................176/65 X
3,400,046  9/1968  Barker.................................176/65 X Primary Examiner—Benjamin R. Padgett
Assistant Examiner—S. R. Hellman
Attorney—Craig, Antonelli & Hill

[57] ABSTRACT

A liquid-cooled nuclear reactor comprising at least one pump for circulating the liquid through the reactor core and through at least one heat exchanger for cooling said liquid, said pump, said heat exchanger and said reactor core are immersed in a same mass of said liquid and disposed respectively in three vertical tanks which contain said liquid mass and which open at the top into a same inert gas atmosphere, said tanks have the shape at least partially of cylinders which are substantially identical in diameter and secant in pairs.

11 Claims, 4 Drawing Figures

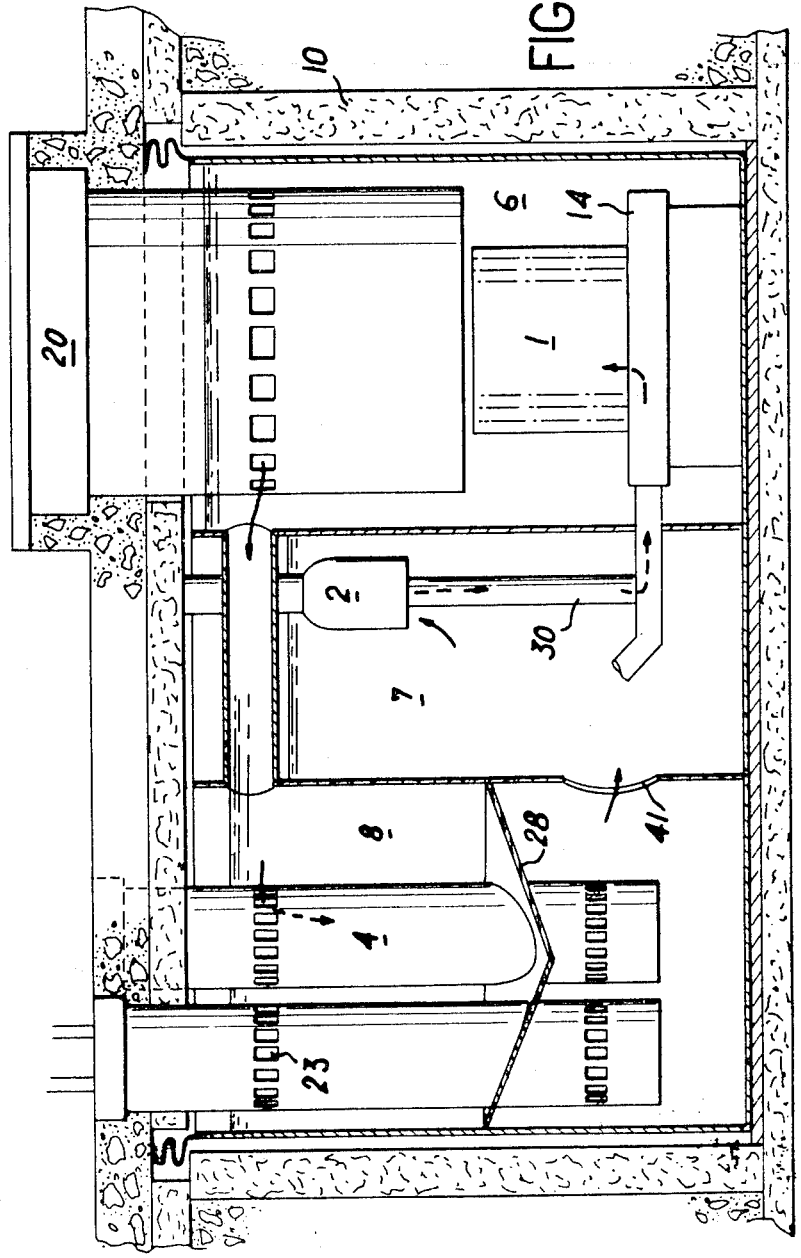

LIQUID-COOLED NUCLEAR REACTOR

This invention has for its object a nuclear reactor which is cooled by a liquid and especially by a liquid metal, comprising at least one pump for circulating said liquid through the reactor core and through at least one heat exchanger for cooling said liquid, said pump and said heat exchanger being immersed together with the reactor core in a same mass of said liquid.

Reactors of this type, which are usually referred-to as "integrated," constitute a particularly advantageous solution in the case of fast-neutron reactors which are cooled by circulation of a liquid metal such as sodium.

As a rule, these reactors comprise a number of primary circuits, that is to say a plurality of heat exchangers and a plurality of liquid-metal pumps. The "integration" of heat exchangers and pumps together with the reactor core within a same mass of sodium makes it possible to reduce the length of connecting piping required between equipment units to a considerable extent. At the same time, the "integrated" concept facilitates the solution of sealing problems and simplifies the preheating operation which is necessary prior to start-up of the reactor for the purpose of liquefying the metal coolant. Moreover, in order to simplify fuel handling operations, it is an advantage to place the reactor within a tank which is open at the top and communicates with another tank in which both pumps and heat exchangers are immersed.

Compared with reactors of this type which are already known, the present invention has the essential object of dispensing with connecting piping to an even greater extent, of reducing the volume of the pressure vessel which, in accordance with conventional practice, contains the mass of liquid metal and a blanket of inert gas above said mass, and also of reducing the mass of liquid metal which is necessary. This reduction in volumes and a suitable relative arrangement of the different elements of the reactor also facilitates the transmission of loads from the super-structures.

The aim of the present invention is to provide a nuclear reactor which is cooled by a liquid and especially a liquid metal, comprising at least one pump for circulating said liquid through the reactor core and through at least one heat exchanger for cooling said liquid, said pump, said heat exchanger and said reactor core being immersed in a same mass of said liquid and disposed respectively in three vertical tanks which contain said liquid mass and which open at the top into a same inert gas atmosphere, said reactor being characterized in that said tanks have the shape, at least partially, of cylinders which are substantially identical in diameter and secant in pairs.

As a preferred feature, the axes of said cylinders are aligned.

The tanks of the reactor according to the invention make it possible to reduce heat losses by radiation as a result of a substantial reduction in area of the free level. The separation area between the hot sodium and cold sodium is considerably smaller and makes it possible to reduce losses by conduction. The external area of the tanks and the volume of liquid are also reduced.

Particular forms of construction of the reactor according to the invention will be described below by way of example without thereby implying any limitation of this invention. Reference is made to FIGS. 1 to 4 of the accompanying drawings, in which.

Figure 4:
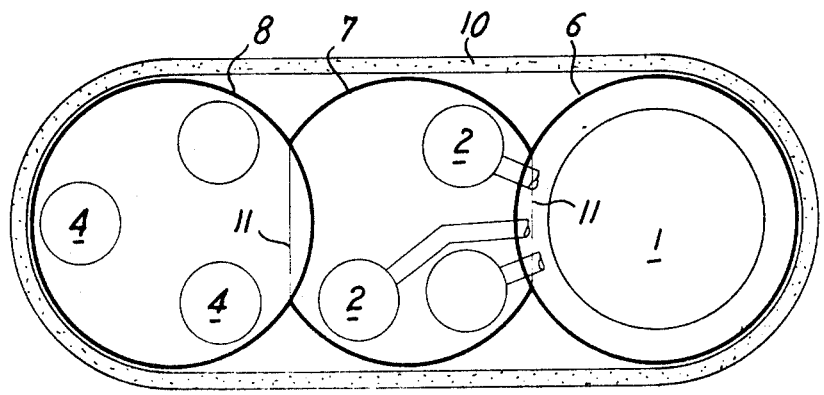

FIG. 3 relates to a second form of construction of the reactor in which the tank containing the pumps is disposed between the tank containing the reactor and the tank containing the heat exchangers;

FIG. 4 constitutes the location diagram corresponding to said second form of construction.

The nuclear reactor which is considered in the particular forms of construction described hereinafter is a fast reactor of the type which is cooled by circulation of liquid sodium. This circulation is carried out through the reactor core 1 in the upward direction by means of pumps 2 which deliver the cold sodium to the base of the reactor core.

The liquid sodium, which is heated as it flows through the reactor core, is then cooled within heat exchangers 4 by heat transfer with liquid sodium which is circulated within a secondary circuit. Only the inlets and outlets of secondary sodium are shown diagrammatically at 5 in the figures.

The reactor core 1, the pumps 2 and the heat exchangers 4 are respectively disposed in three vertical tanks 6, 7 and 8. These three tanks are mainly delimited respectively by three cylinders, the axes of which are aligned; the cylinder which defines the central tank which contains either the heat exchangers or the pumps, depending on the form of construction, is secant with the two others; balancing of forces at the points of junction is obtained by means of a flat partition wall 11. This arrangement serves to reduce the area in plan which is occupied by the three tanks as well as the overall volume.

The complete assembly of the three tanks is surrounded by a heat-insulating shell 10. A concrete structure 11 provides biological protection.

The tanks 6, 7 and 8 contain liquid sodium in which are immersed the reactor itself, the pumps and the heat exchangers. The three tanks open at the top into a same inert gas atmosphere with is present above the free level of the sodium. Said tanks are connected to a superstructure 12 by means of a bellows seal 13.

The reactor core 1 is constituted by vertical assemblies between which the liquid sodium is circulated in the upward direction. The core is supported on a diagrid 14 through which the liquid sodium is fed from an annular manifold 16. Said diagrid is in turn carried by a cylindrical support 17 on the bottom of the tank 6. The liquid sodium which passes out of the reactor core flows through an upper shield 18 and is discharged therefrom through openings 19 into the tank 6.

The fuel assemblies are readily accessible from the superstructures by employing for this purpose a conventional system of two eccentric rotary plugs. Only the large rotary plug 20 is shown in the figures.

Each heat exchanger 4 is constituted by a tube bank through which the secondary liquid sodium is circulated. Said tube bank is surrounded by a cylindrical shell 22 provided at the two extremities thereof with windows 23 and 24 permitting respectively the admission of hot sodium and the discharge of sodium which has been cooled in contact with the tube bank (as shown in particular in FIG. 1).

There is associated with each heat exchanger a removable plug 26 which makes it possible to gain access to the heat exchanger from the superstructures and if necessary even to extract the reactor and which is traversed by the ducts 5 for the admission and discharge of secondary sodium.

The tank 8 which contains the heat exchangers 4 comprises a partition wall 28 which divides into two volumes the sodium contained in the tank 8 around the shells 22. The two volumes are in communication with each other by means of the heat exchangers : the sodium of the upper volume penetrates into each heat exchanger through the openings 23 and passes out into the lower volume through the openings 24.

Each pump 2 which is immersed in the tank 7 sucks the liquid sodium directly into said tank. The sodium is then delivered axially into a duct 30 and conveyed therein down to the reactor diagrid. Each pump is driven by a motor 32 which is located above the superstructures. The driving shaft traverses a removable plug 33 which makes it possible to gain access to the pump.

Figure 1:
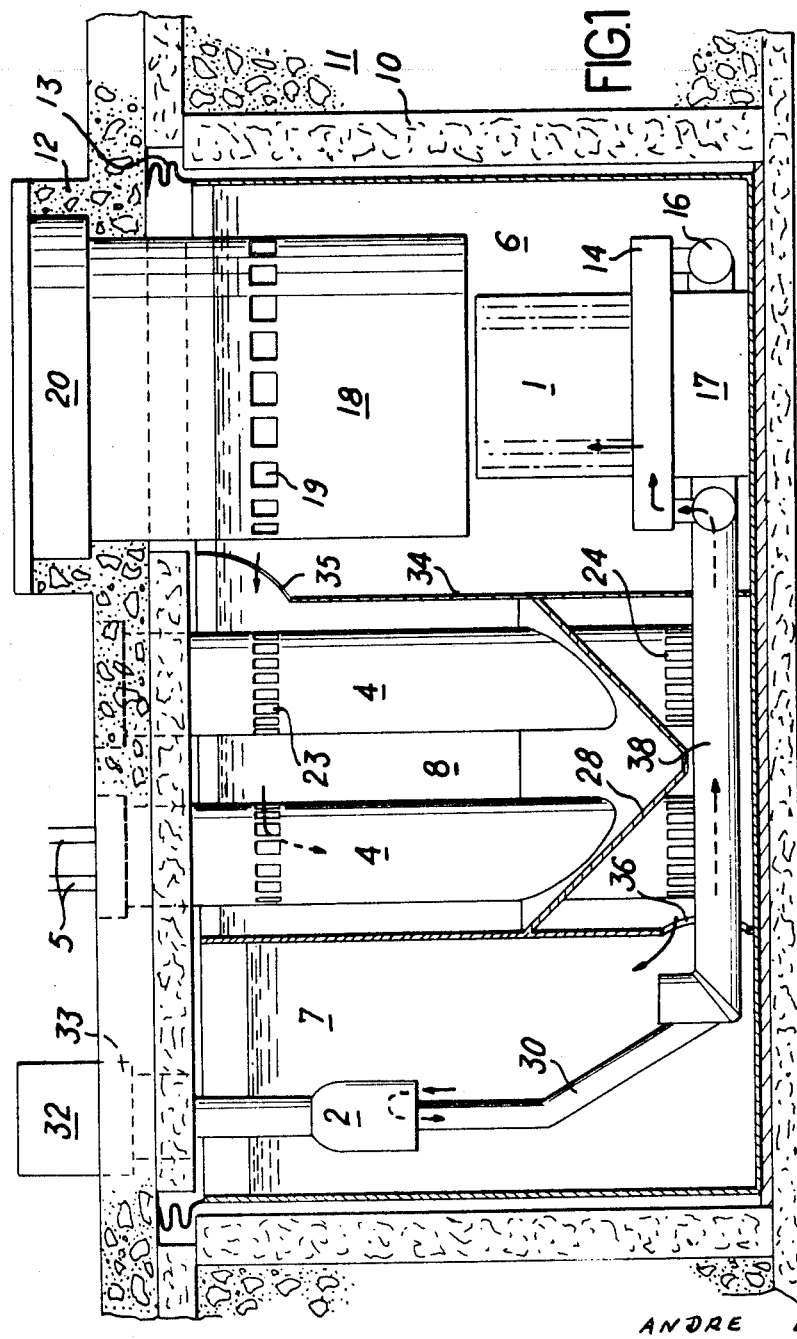
FIG. 1 is a vertical sectional view of a first form of construction of the reactor according to the invention in which the tank containing the heat exchangers is located between the tank containing the reactor and the tank containing the pumps.
Figure 2:
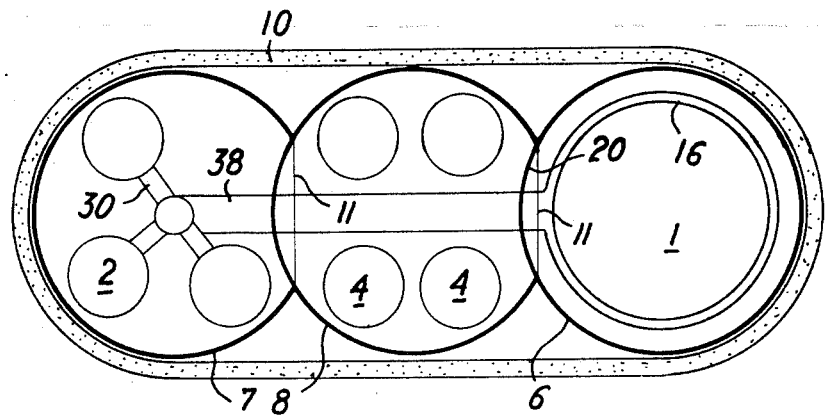
FIG. 2 shows diagrammatically the location of the different elements in the reactor of FIG. 1.

In the first form of construction illustrated in FIGS. 1 and 2, the central tank is the tank 8 which contains the heat exchangers. Said tank 8 therefore has a section of wall 34 which is common with the tank 6 containing the reactor. Said common wall section is provided with a substantial recessed portion at the upper end thereof so as to form a spillway 35 through which the hot sodium of the tank 6 is freely discharged without any appreciable pressure drop into the tank of the heat exchangers 8. These two tanks have thus the same free level of sodium.

Moreover, the lower portion of the tank 8 which is located beneath the partition wall 28 is adapted to communicate with the tank containing the pumps 7 via an opening 36 which is pierced in their common wall. The level of liquid sodium in the tank 7 which results from suction by the pumps is lower than the level which is common to the tanks 6 and 8.

The delivery ducts 30 of the different pumps open into a single duct 38 which provides a connection with the downstream side of the reactor core. Said duct 38 passes through the opening 36, traverses the tank 8, then penetrates through a leak-tight passage into the tank 6 so as to return to the annular manifold 6.

In this form of construction, which has the advantage of not producing any pressure drop between the reactor and the heat exchangers, the sodium coolant circuit is generally arranged as follows : after being delivered by the pumps and the duct 38, the sodium flows through the reactor core 1, is discharge from the tank 6 containing the reactor through the spillway 35 to the tank 8 containing the heat exchangers 8, flows through the heat exchangers 4, is then cooled, passes from the tank 8 through the openings 36 into the tank 7 so as to be recirculated by the pumps.

In the form of construction which is shown in FIGS. 3 and 4, the central tank is the tank 7 which contains the pumps. The advantage of this solution lies in the fact that the pumps are located closer to the reactor core, thereby making it possible to reduce the length of the connecting piping. The deliver ducts 30 pass individually through the wall 34 which is common to the tanks 6 and 7 open directly into the diagrid 14.

In this embodiment, the connection between the tank 6 of the reactor and the top portion of the tank 8 of the heat exchangers is provided by a passage 40 which passes in leak-tight manner through the tank 7. This passage has a large diameter but nevertheless produces a slight pressure drop between the two tanks.

In this case, the sodium which is delivered by the pumps 2 flows through the reactor core 1 in which it is heated, flows from the tank 6 to the heat-exchanger tank 8 through the passage 40, flows through the heat exchangers 4, is then cooled, flows from the tank 8 to the pump tank 7 through an opening 41 formed in the wall which is common to the two tanks.

It is readily apparent that the invention is not limited in any sense to the particular forms of construction which have been described in the foregoing but extends to all alternative forms.

What we claim is :

1. A liquid-cooled nuclear reactor comprising at least one pump for circulating the liquid through the reactor core and through at least one heat exchanger for cooling said liquid, said pump, said heat exchanger and said reactor core being immersed in a same mass of said liquid and disposed respectively in three sequentially intersecting vertical tanks which contain said liquid mass and which open at the top into a same inert gas atmosphere, said tanks having the shape at least partially of cylinders which are substantially identical in diameter, the tank containing said reactor core intersecting only with one of the other two tanks, said reactor further including conduit means disposed between said tanks to provide liquid communication.

2. A nuclear reactor in accordance with claim 1, wherein the axes of said cylinders are aligned.

3. A nuclear reactor in accordance with claim 1, wherein each pump is connected by means of an individual duct to a first of said tanks containing the reactor core upstream of said core.

4. A nuclear reactor in accordance with claim 1, wherein the tank containing the heat exchanger is disposed between the tank containing the reactor and the tank containing the pump.

5. A nuclear reactor in accordance with claim 1, wherein the tank containing the pump is disposed between the tank containing the reactor and the tank containing the heat exchanger and is traversed by a passage which provides a communication between said tanks.

6. A liquid-cooled nuclear reactor comprising a container means divided by partition means into a pump chamber containing at least one pump means, a heat exchange chamber containing at least one heat exchange means and a reactor chamber containing at least one reactor means, the heat exchange chamber being disposed between the other tow chambers, and all of said chambers being adapted to contain a cooling liquid, conduit means extending from the pump means through the lower portion of the heat exchange chamber and into the reactor chamber, said conduit means providing communication between said pump means and the core of the reactor means, aperture means disposed in the upper portion of the partition means which separates the reactor chamber from the heat exchange chamber, for introducing the cooling liquid from the upper portion of the reactor chamber to the upper portion of the heat exchange chamber, and aperture means disposed in the lower portion of the partition means which separates the heat exchange chamber from the pump chamber, for reintroducing the cooling liquid from the the portion of the heat exchange chamber to the lower portion of the pump chamber where the cooling liquid is again taken up by the pump means for repeating the cycle, said chambers being sequentially intersecting.

7. The reactor of claim 6, wherein the three chambers are surrounded by an insulating shell, said chambers being connected to the superstructure of said shell by bellows seal means.

8. The reactor of claim 6, wherein a partition wall divides the heat exchange chamber into two volumes, said volumes communicating with each other through the heat exchange means, the cooling liquid in the upper volume passing into the upper portion of the heat exchanger and exiting out of the lower portion of the heat exchanger on the other side of the partition wall into the lower portion of the chamber.

9. The apparatus of claim 6, wherein the aperture means disposed in the lower portion of the partition means separating the pump chamber from the heat exchange chamber also houses the conduit means which provides communication between the pump means and the reactor means.

10. A liquid-cooled nuclear reactor comprising a container means divided by partition means into a heat exchange chamber containing at least one heat exchange means, a pump chamber containing at least one pump means and a reactor chamber containing at least one reactor means, the pump chamber being disposed between the heat exchange chamber and the reactor chamber, and all of said chambers being adapted to contain a cooling liquid, conduit means extending from the pump means into the reactor chamber, channel means disposed in the upper portion of the pump chamber, said channel means providing a leak-tight communication between the upper portion of the reactor chamber and the upper portion of the heat exchange chamber, and aperture means disposed in the lower portion of the partition means separating the heat exchange chamber from the pump chamber for reintroducing the cooling liquid from the lower portion of the heat exchange chamber to the lower portion of the pump chamber where the cooling liquid is again taken up by the pump means for repeating the cycle, said chambers being sequentially intersecting.

11. The reactor of claim 10, wherein a partition wall divides the heat exchange chamber into two volumes, said volumes communicating with each other through the heat exchange means, the cooling liquid in the upper volume passing into the upper portion of the heat exchanger and exiting out of the lower portion of the heat exchanger on the other side of the partition wall into the lower portion of the chamber.

* * * * *